US006616744B1

(12) United States Patent
Sainz et al.

(10) Patent No.: US 6,616,744 B1
(45) Date of Patent: Sep. 9, 2003

(54) METHOD OF FORMING INORGANIC PIGMENTS

(75) Inventors: Javier Garcia Sainz, Castellon (ES); Rosario Blanch Castello, Castellon (ES); Rafael Mena Pla, Castellon (ES); Juan Carlos Gallart, Valencia (ES)

(73) Assignee: Ferro Corporation, Cleveland, OH (US)

( * ) Notice: Subject to any disclaimer, the term of this patent is extended or adjusted under 35 U.S.C. 154(b) by 0 days.

(21) Appl. No.: 10/124,740

(22) Filed: Apr. 17, 2002

(51) Int. Cl.$^7$ .................................................. C09C 1/62
(52) U.S. Cl. .................. 106/403; 106/400; 423/593; 423/594; 423/595; 423/596; 423/597; 423/598; 423/599; 423/600; 423/601; 423/602; 423/603
(58) Field of Search ................................ 106/403, 400; 419/16; 75/232, 235, 343; 423/593–603

(56) References Cited

U.S. PATENT DOCUMENTS

| 4,159,207 | A | 6/1979 | Nuss |
| 4,202,702 | A | 5/1980 | Nuss |
| 4,216,023 | A | 8/1980 | Kinstle |
| 4,353,991 | A | 10/1982 | Van Ness et al. |
| 4,859,637 | A | 8/1989 | Roberts |
| 5,080,718 | A | 1/1992 | Sullivan et al. |
| 5,228,910 | A | 7/1993 | Joyce et al. |
| 5,316,570 | A | 5/1994 | Blonski |
| 6,136,086 | A | 10/2000 | Hen et al. |
| 6,174,359 | B1 | 1/2001 | Speer et al. |
| 6,207,285 | B1 | 3/2001 | Sakoske et al. |
| 6,235,103 | B1 | 5/2001 | Letschert et al. |
| 6,235,106 | B1 | 5/2001 | Loucka et al. |
| 6,294,009 | B1 | 9/2001 | Letschert et al. |

*Primary Examiner*—C. Melissa Koslow
*Assistant Examiner*—Shalie Manlove
(74) *Attorney, Agent, or Firm*—Rankin, Hill, Porter & Clark LLP

(57) ABSTRACT

The present invention provides a method of forming inorganic pigments using one or more metal alloys. Metal alloys used in the method of the invention are preferably milled to a mean particle size of less than about 10 microns, may be mixed with other metal oxides, and calcined in the presence of oxygen in a rotary kiln. Inorganic pigments formed in accordance with the method of the invention can be used in a wide variety of applications, including the coloration of glass matrixes, ceramic bodies, polymers, and paints.

10 Claims, No Drawings

METHOD OF FORMING INORGANIC PIGMENTS

FIELD OF INVENTION

The present invention relates to a method of forming inorganic pigments. More particularly, the present invention relates to a method of forming inorganic, pigments using one or more metal alloys as components of the rawbatch.

BACKGROUND OF THE INVENTION

Inorganic pigments are typically produced by subjecting mixtures of selected metal oxides to high temperature calcination. During calcination, the mixtures of selected metal oxides undergo solid-state reactions and form solid solutions or crystalline structures consisting almost exclusively of crystals containing metal cations and oxygen ions. Inorganic pigments are used in a wide variety of applications, including the coloration of glass matrixes, ceramic bodies, polymers, and paints.

One well-known example of a inorganic pigment is cobalt-chromium-iron-manganese-nickel (Co, Fe, Mn, Ni) (Fe, Cr, Mn)$_2$O$_4$ black spinel. This inorganic pigment is typically formed by the high temperature calcination of a mixture of iron oxide (Fe$_2$O$_3$) as crystalline hematite and chrome oxide (Cr$_2$O$_3$), cobalt oxide (CoO), nickel oxide (NiO), and/or manganese oxide (Mn$_2$O$_3$). The raw material cost of certain metal oxide components such as chrome oxide, for example, can be a significant contributing factor in the final cost of the inorganic pigment.

SUMMARY OF INVENTION

The present invention provides a method of forming inorganic pigments using one or more metal alloys. Generally speaking, metal alloys can provide a less expensive source of some metal oxides that are incorporated as cations into the crystal lattice structure of the inorganic pigments. In accordance with the method of the invention, one or more metal alloys is preferably milled to a mean particle size of less than about 10 microns, mixed with other metal oxides, and then the mixture is calcined in the presence of oxygen in a rotary kiln to form the inorganic pigment.

The foregoing and other features of the invention are hereinafter more fully described and particularly pointed out in the claims, the following description setting forth in detail certain illustrative embodiments of the invention, these being indicative, however, of but a few of the various ways in which the principles of the present invention may be employed.

DETAILED DESCRIPTION OF PREFERRED EMBODIMENTS

Quite a number of metal alloys are readily available in the market. These metal alloys, which comprise alloys of two or more metals, are typically available as coarse powders or flakes. The term "coarse" in this context should be understood as meaning that the mean particle size of the metal alloys is typically greater than about 20 microns. To facilitate their use in the present invention, it is preferable for such metal alloys to have a mean particle size of less than about 10 microns, and more preferably a mean particle size of less than about 5 microns. The mean particle size of the metal alloys can, if necessary, be reduced by conventional means, such as ball milling or jet-milling.

In order to produce an inorganic pigment in accordance with the invention, it is necessary to mix a sufficient amount of one or more metal alloys with a sufficient amount of one or more host metal oxides to form a rawbatch that, after calcination, will provide an inorganic pigment having the desired composition. The metal oxides used in the invention can comprise synthetic oxides, natural oxides, regenerated oxides, and other suitable metal oxides. In order to determine the relative amounts of metal alloys and metal oxides to use, it is necessary to ascertain the chemical composition of such materials.

Once the rawbatch is formed, it must be calcined. It is critical that the rawbatch be calcined in the presence of oxygen because the metal alloys must undergo oxidation during calcination. Oxygen can be supplied by the use of one or more oxidants in the rawbatch or, more preferably, by calcining the rawbatch in an oxidizing atmosphere such as ambient air. To promote contact between oxygen and the metal alloys during calcination, it is preferably to use a rotary kiln. Calcination is carried out at conventional temperatures, typically between 800° C. and 1200° C.

A wide variety of inorganic pigments can be produced in accordance with the method of the invention. One or more inorganic oxides can be mixed with appropriate amounts of one or more metal alloys and calcined to form inorganic pigments. Inorganic pigments formed in accordance with the method of the invention are essentially indistinguishable from inorganic pigments formed according to known methods.

The following examples are intended only to illustrate the invention and should not be construed as imposing limitations upon the claims.

EXAMPLE 1

A metal alloy powder having a composition, by weight, of 68.360% chrome, 0.180% silicon, 0.004% sulphur, 7.900% carbon, 0.022% phosphorous, and 23.534% iron, was milled to a mean particle size of about 2 microns in a ball mill. 49 parts by weight of the metal alloy powder was mixed with 49 parts by weight of synthetic iron oxide (Fe$_2$O$_3$) and 2 parts by weight of molybdenum oxide (MoO$_3$) to form a rawbatch. The rawbatch was calcined in a rotary kiln in ambient air at a temperature of about 1000° C. for 1 hour. The calcined inorganic pigment was then ball milled to a mean particle size of about 5 microns.

EXAMPLE 2

A metal alloy powder having a composition, by weight, of 68.360% chrome, 0.180% silicon, 0.004% sulphur, 7.900% carbon, 0.022% phosphorous, and 23.534% iron, was milled to a mean particle size of about 2 microns in a jet mill. 50 parts by weight of the metal alloy powder was mixed with 49.8 parts by weight of synthetic iron oxide (Fe$_2$O$_3$) and 0.2 parts by weight of molybdenum oxide (MoO$_3$) to form a rawbatch. The rawbatch was calcined in a rotary kiln in ambient air at a temperature of about 1000° C. for 1 hour. The calcined inorganic pigment was then ball milled to a mean particle size of about 5 microns.

COMPARATIVE EXAMPLE 3

A mixed metal oxide inorganic pigment was prepared by conventional means by mixing 33.50 parts by weight chromium oxide (Cr$_2$O$_3$), 60.5 parts by weight iron oxide (Fe$_2$O$_3$), and 2 parts by weight molybdenum oxide (MoO$_3$) to form a rawbatch. The rawbatch was calcined in a rotary kiln in ambient air at a temperature of about 1000° C. for 1 hour. The calcined inorganic pigment was then ball milled to a mean particle size of about 5 microns.

EXAMPLE 4

Porcelain Tiles A, B, and C were formed from the same raw materials using conventional tile manufacturing techniques. The only difference between the tiles was that Porcelain Tile A contained 2 weight percent of the inorganic pigment formed in EXAMPLE 1, Porcelain Tile B contained 2 weight percent of the inorganic pigment formed in EXAMPLE 2, and Porcelain Tile C contained 2 weight percent of the inorganic pigment formed in Comparative EXAMPLE 3. The ClElab calorimetric coordinates for Porcelain Tiles A, B, and C were determined using a Hunter calorimeter. The colorimetric coordinates for Porcelain Tiles A, B, and C are reported in Table 1 below:

TABLE 1

|    | Tile A | Tile B | Tile C |
|----|--------|--------|--------|
| L* | 35.55  | 35.50  | 35.37  |
| a* | 1.30   | 0.59   | 0.48   |
| b* | 0.83   | 0.10   | −0.48  |

Additional advantages and modifications will readily occur to those skilled in the art. Therefore, the invention in its broader aspects is not limited to the specific details and illustrative examples shown and described herein. Accordingly, various modifications may be made without departing from the spirit or scope of the general inventive concept as defined by the appended claims and their equivalents.

What is claimed:

1. A method of forming an inorganic pigment comprising calcining a rawbatch comprising a mixture of metal oxide particles and metal alloy particles in the presence of oxygen.

2. The method of forming an inorganic pigment according to claim 1 wherein said metal alloy particles have a mean particle size of less than about 10 microns.

3. The method of forming an inorganic pigment according to claim 1 wherein said metal alloy particles have a mean particle size of less than about 5 microns.

4. The method of forming an inorganic pigment according to claim 1 wherein said metal oxide particles comprise one or more selected from the group consisting of synthetic metal oxides, natural metal oxides, and regenerated metal oxides.

5. The method of forming an inorganic pigment according to claim 1 wherein said calcining step is accomplished using a rotary kiln.

6. The method of forming an inorganic pigment according to claim 1 wherein said rawbatch is calcined at a temperature of from about 800° C. to about 1200° C.

7. The method of forming an inorganic pigment according to claim 1 wherein said oxygen is supplied by one or.more oxidants in said rawbatch and/or by an oxidizing atmosphere.

8. The method of forming an inorganic pigment according to claim 1 wherein said metal oxide comprises iron oxide having a hematite crystalline lattice structure.

9. The method of forming an mixed metal oxide inorganic pigment according to claim 8 wherein said metal alloy contains cobalt, nickel, manganese, molybdenum, and/or chromium.

10. The method of forming an inorganic pigment according to claim 1 wherein said metal oxide has a spinel crystalline lattice structure.

* * * * *